United States Patent
Slocum et al.

(10) Patent No.: US 8,583,421 B2
(45) Date of Patent: Nov. 12, 2013

(54) METHOD AND APPARATUS FOR PSYCHOMOTOR AND PSYCHOLINGUISTIC PREDICTION ON TOUCH BASED DEVICE

(75) Inventors: Jeremy Slocum, Antioch, IL (US); Yuen-Keen Cheong, Elk Grove Village, IL (US); Minh Quan Phan Huy, Round Lake, IL (US); Chad Phipps, Grayslake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 881 days.

(21) Appl. No.: 12/717,555

(22) Filed: Mar. 4, 2010

(65) Prior Publication Data
US 2010/0228539 A1   Sep. 9, 2010

Related U.S. Application Data

(60) Provisional application No. 61/158,113, filed on Mar. 6, 2009.

(51) Int. Cl.
*G06F 17/27* (2006.01)

(52) U.S. Cl.
USPC ...... 704/9; 704/1; 704/10; 382/209; 382/214; 382/309; 345/169; 345/170; 345/173; 345/179; 707/706; 707/707; 707/708

(58) Field of Classification Search
USPC ............... 704/1, 9, 10; 382/209, 214, 309; 345/169, 170, 173, 179; 707/706–708
See application file for complete search history.

(56) References Cited

U.S. PATENT DOCUMENTS

| | | | |
|---|---|---|---|
| 5,748,512 A * | 5/1998 | Vargas | 708/142 |
| 5,801,941 A | 9/1998 | Bertram | |
| 6,259,436 B1 | 7/2001 | Moon et al. | |
| 6,323,846 B1 * | 11/2001 | Westerman et al. | 345/173 |
| 6,677,932 B1 * | 1/2004 | Westerman | 345/173 |

(Continued)

FOREIGN PATENT DOCUMENTS

| | | |
|---|---|---|
| WO | 0038041 A1 | 6/2000 |
| WO | 00/74240 A1 | 12/2000 |
| WO | 2808/030880 A1 | 3/2008 |
| WO | 2008095153 A2 | 8/2008 |

OTHER PUBLICATIONS

Patent Cooperation Treaty, "PCT Search Report and Written Opinion of the International Searching Authority" for International Application No. PCT/US2010/026328 Dec. 17, 2010, 12 pages.

(Continued)

*Primary Examiner* — Lamont Spooner (57) ABSTRACT

A method (300 or 400) of key press prediction on a touch-based device or an apparatus (501) can entail registering (302, 402) a position of a touch press attempt on an icon among a plurality of icons presented on the touch-base device, calculating (304, 404) a distance from a center of the icon, calculating (306, 406) a psychomotor probability for each icon in the plurality of icons, calculating (312, 408) a linguistic probability for each icon in the plurality of icons, calculating (314, 410) a predictive index for each icon in the plurality of icons based on the psychomotor probability and the linguistic probability, and registering (310,416) as a user selected icon, an icon with one among a highest predictive index (316, 412) or a probability higher than a predetermined absolute value (308).

18 Claims, 7 Drawing Sheets

(56) References Cited

U.S. PATENT DOCUMENTS

| | | | |
|---|---|---|---|
| 7,042,442 B1* | 5/2006 | Kanevsky et al. | 345/169 |
| 7,380,724 B2 | 6/2008 | Unruh | |
| 7,479,949 B2* | 1/2009 | Jobs et al. | 345/173 |
| RE40,993 E* | 11/2009 | Westerman | 345/173 |
| RE43,082 E* | 1/2012 | Gutowitz | 341/22 |
| 8,232,973 B2* | 7/2012 | Kocienda et al. | 345/173 |
| 2002/0183100 A1* | 12/2002 | Parker | 455/566 |
| 2004/0136564 A1* | 7/2004 | Roeber et al. | 382/100 |
| 2004/0163032 A1* | 8/2004 | Guo et al. | 715/500 |
| 2004/0183833 A1 | 9/2004 | Chua | |
| 2005/0122313 A1* | 6/2005 | Ashby | 345/168 |
| 2006/0050062 A1* | 3/2006 | Ozawa et al. | 345/173 |
| 2006/0066589 A1* | 3/2006 | Ozawa et al. | 345/173 |
| 2006/0066590 A1* | 3/2006 | Ozawa et al. | 345/173 |
| 2007/0216658 A1* | 9/2007 | Rainisto | 345/173 |
| 2007/0273561 A1 | 11/2007 | Philipp | |
| 2008/0174570 A1* | 7/2008 | Jobs et al. | 345/173 |
| 2008/0189605 A1* | 8/2008 | Kay et al. | 715/257 |
| 2008/0266148 A1* | 10/2008 | Chen | 341/67 |
| 2009/0007001 A1* | 1/2009 | Morin et al. | 715/773 |
| 2009/0158144 A1* | 6/2009 | Griffin | 715/261 |
| 2009/0251425 A1* | 10/2009 | Sohn et al. | 345/173 |
| 2010/0164897 A1* | 7/2010 | Morin et al. | 345/173 |
| 2011/0035696 A1* | 2/2011 | Elazari et al. | 715/773 |

OTHER PUBLICATIONS

Patent Cooperation Treaty, "PCT International Preliminary Report on Patentability", for International Application No. PCT/US2010/026328, Sep. 15, 2011, 8 pages.

* cited by examiner

140  Motor targeting - Icon and target ratio for

FIG. 4  each icon determined by studying typical user hit distribution

150  Dynamic targeting - Icon and target ratio change for

FIG. 5  specific targets bases on information (language properties)

160

FIG. 6    Motor + Dynamic Targeting

METHOD AND APPARATUS FOR PSYCHOMOTOR AND PSYCHOLINGUISTIC PREDICTION ON TOUCH BASED DEVICE

CROSS-REFERENCE TO RELATED APPLICATIONS

This application claims the priority of U.S. Provisional Application No. 61/158,113, which was filed on Mar. 6, 2009 and which is incorporated herein in its entirety.

FIELD

This subject matter herein relates generally to touch-based devices and more particularly to techniques for intended button press predictions on touch-based devices.

BACKGROUND

Unlike physical keys, touch screen targets do not have tactile indicators for accurate finger presses. Therefore touch screen targets have a large variability for accuracy among users and includes handedness biases. For good touch targets, existing literature has recommended target sizes 7- to 10-mm in approximate diameter. Given current real-estate constraints in touch screen displays, it is difficult to fit a full QWERTY layout without adding plurality in the keys (multiple key assignments to the same touch area).

There are three existing general solutions that fail to provide an optimum user experience. In one existing solution, the key sizes are maintained at recommended valued and plurality in keys are introduced (i.e., multiple characters assigned to the same key). In a second solution, key singularity is maintained and the key size is reduced. In a third solution, post-hoc correction is provided. With each of these techniques there are further enhancements that attempt to provide a better user experience. For example, with a maintained key singularity and reduced key size, one alternative can provide visual confirmation (in a main screen region) of a user intended key press and further provide disambiguation of simultaneous key presses (which are likely to occur with the smaller key sizes). In general, the existing enhancements still fail to provide a satisfactory user experience.

DETAILED DESCRIPTION OF THE DRAWINGS

Embodiments herein can provide a method to minimize typing errors by means of predicting user intended key press. Generally, a solution in accordance with the embodiments can provide for error prevention and can additionally or alternatively provide for error correction as well. Error prevention is a means for predicting user intended key press, avoiding errors during the typing process or in other words as the user is composing a text. Error correction is a means for correcting errors not captured by the prevention techniques where error correction is applied after a word is completed or when the end of a word is detected.

In a first embodiment, a method of key press prediction on a touch-based device can entail registering a position of a touch press attempt on an icon among a plurality of icons presented on the touch-base device, calculating a distance from a reference point (e.g., a center of the icon, or a centroid of touch points) of the icon, calculating a psychomotor probability for each icon in the plurality of icons, calculating a linguistic probability for each icon in the plurality of icons, calculating a predictive index for each icon in the plurality of icons based on the psychomotor probability and the linguistic probability, and registering as a user selected icon, an icon with one among a highest predictive index and a probability higher than a predetermined absolute value.

In a second embodiment, an electronic device can entail a touch-based presentation device and a controller coupled to the touch-based presentation device. The controller can be operable to register a position of a touch press attempt on an icon among a plurality of icons presented on the touch-base device, calculate a distance from a reference point of an icon, calculate a psychomotor probability for each icon in the plurality of icons, calculate a linguistic probability for each icon in the plurality of icons, calculate a predictive index for each icon in the plurality of icons based on the psychomotor probability and the linguistic probability, and register as a user selected icon, an icon with one among a highest predictive index and a probability higher than a predetermined absolute value.

In a third embodiment a portable communication device can include a touch-based screen and a controller coupled to the touch-based screen. The controller can be operable to register a position of a touch press attempt on an icon among a plurality of icons presented on the touch-base device, calculate a distance from a center of the icon, calculate a psychomotor probability for each icon in the plurality of icons, calculate a linguistic probability for each icon in the plurality of icons, calculate a predictive index for each icon in the plurality of icons based on the psychomotor probability and the linguistic probability, and register as a user selected icon, an icon with one among a highest predictive index.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

The terms "program" or "software application" are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. The term "mobile device" or "portable communication device" as used in the claims is not necessarily limited to a cellular, mobile, or cordless phone, but can include almost any electronic device (such as a remote controller, headset, personal digital assistant, laptop computer to name a few) able to function within contemplation of the description and claimed embodiments herein.

Other embodiments, when configured in accordance with the inventive arrangements disclosed herein, can include a system for performing and a machine readable storage for causing a machine to perform the various processes and methods disclosed herein.

While the specification concludes with claims defining the features of embodiments of the invention that are regarded as novel, it is believed that the invention will be better understood from a consideration of the following description in conjunction with the figures, in which like reference numerals are carried forward.

Figure 1:
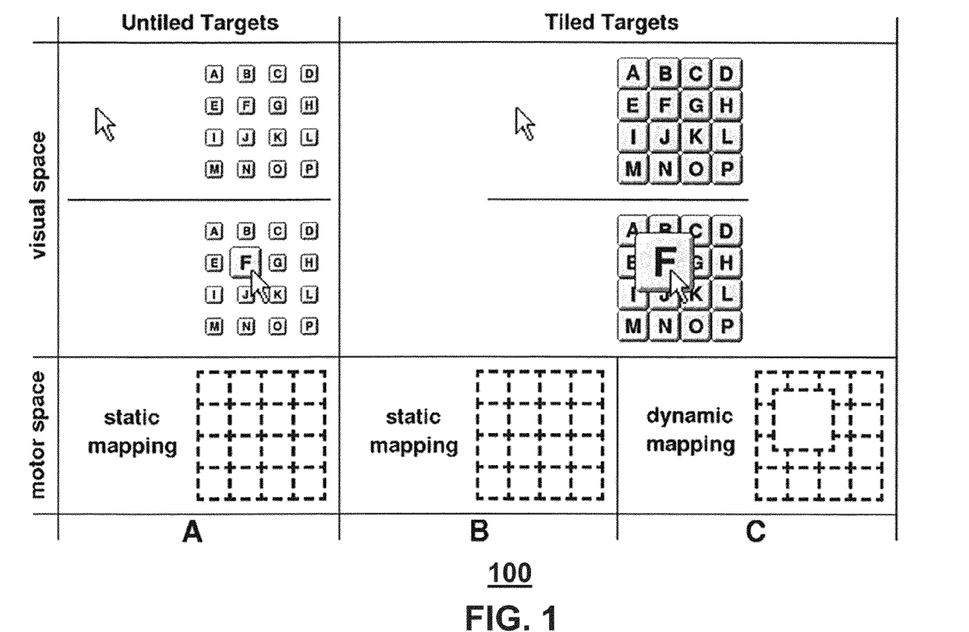
FIG. 1 is an illustration demonstrating an existing deterministic method of icon-target association.
Figure 2:
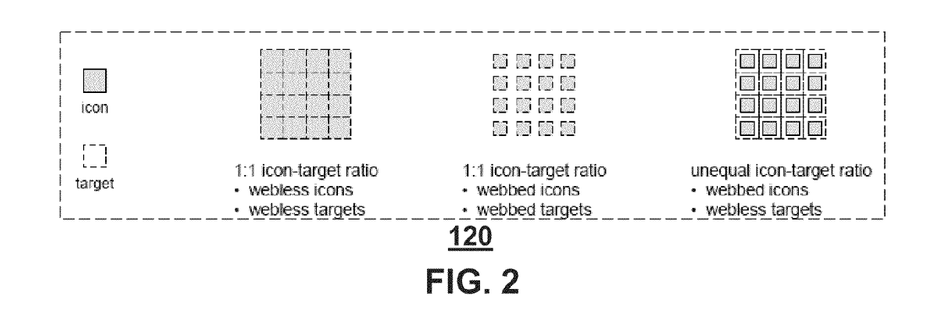
FIG. 2 is another illustration demonstrating existing deterministic methods of icon-target associations.
Figure 3:
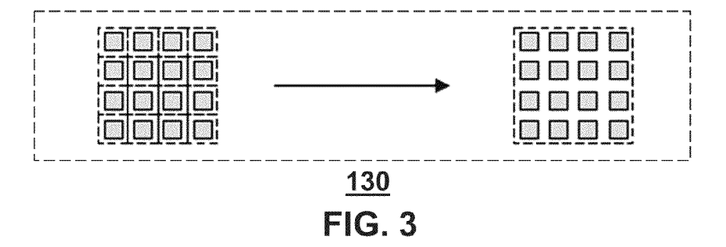
FIG. 3 illustrates a transition from a deterministic method to a probabilistic method in accordance with the embodiments.

Embodiments herein can be implemented in a wide variety of ways using a variety of technologies that enable the error prevention and error correction techniques proposed herein. The goal is to minimize typing errors by means of predicting user intended key presses. The existing techniques of icon-target association as shown in illustration 100 of FIG. 1 and illustration 120 of FIG. 2 are deterministic in nature. In other words, these techniques determine whether an xy position falls inside a target or not. Other factors are not generally considered. The embodiments herein do not necessarily have one-to-one icon-target definitions as illustrated by diagram 130 of FIG. 2. Rather, the Icon-target relationships are probabilistic as indicated in FIG. 3 for (deterministic approach as shown in left, probabilistic as shown in right).

The techniques proposed can include two main modules that primarily involve error prevention and error correction. As noted above, error prevention is a means for predicting user intended key press, avoiding errors during the typing process, ie., as the user is constructing a word. Error correction is a means for correcting errors that was not captured by the prevention module, correction is applied after a word is completed, ie., end of word is detected.

Figure 4:
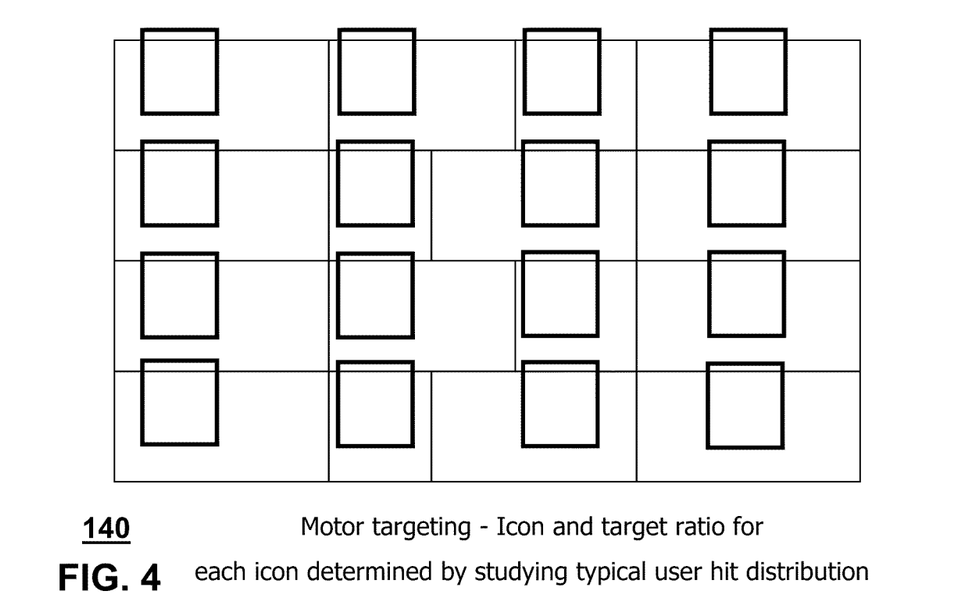
FIG. 4 is an illustration demonstrating psychomotor targeting in accordance with an embodiment herein.
Figure 5:
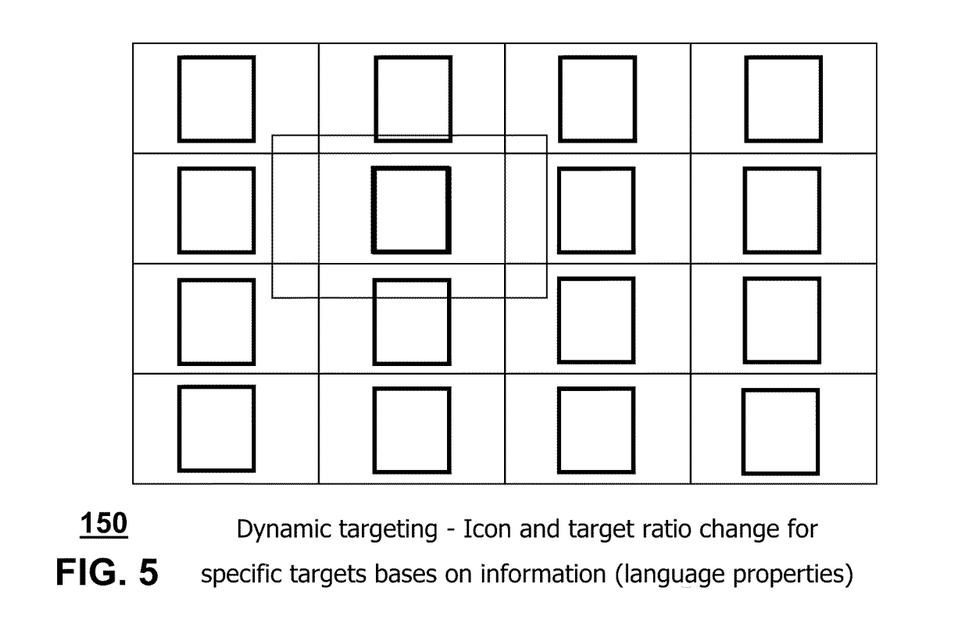
FIG. 5 is an illustration demonstrating psycholinguistic targeting in accordance with an embodiment herein.
Figure 6:
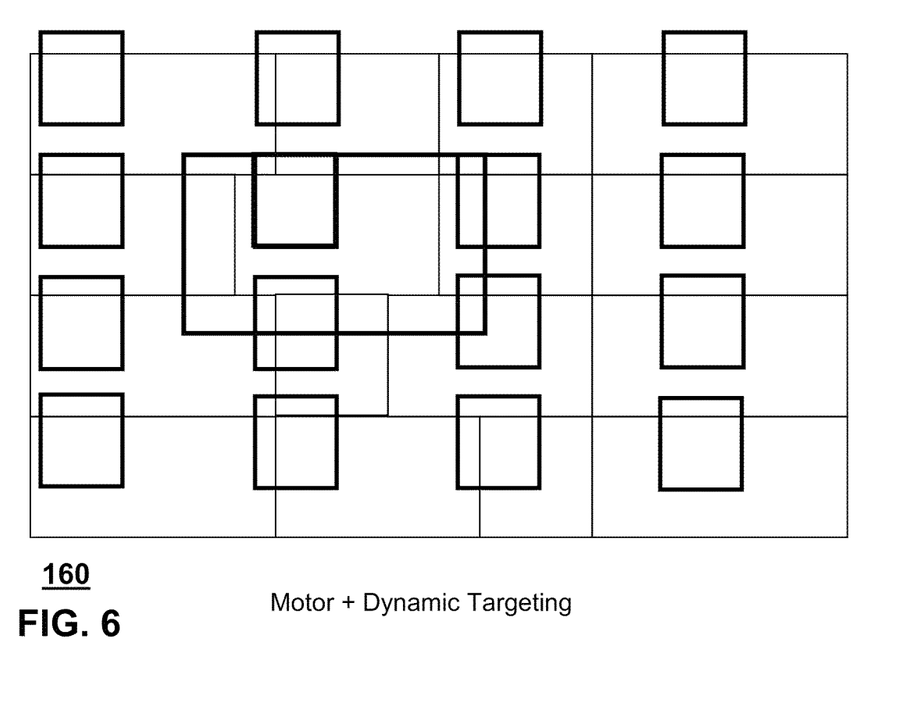
FIG. 6 is an illustration demonstrating a combination of psychomotor and psycholinguistic targeting in accordance with an embodiment herein.

More particularly in one embodiment, methods herein entail primarily error prevention. Error prevention can involve pre-emptive measures to improve typing accuracy. User intended key press can be determined by combining two prediction models: psychomotor and psycholinguistic. Illustration 140 of FIG. 4 demonstrates psychomotor targeting when an icon to target ratio for each icon is determined by studying typical user hit distributions. Illustration 150 of FIG. 5 demonstrates dynamic targeting based on psycholinguistic parameters where icon and target ratios change for specific targets based on information related to language properties. The illustration of FIG. 160 of FIG. 6 demonstrates a combination of psychomotor and psycholinguistic targeting as contemplated herein. This is an intelligent, machine-assisted part of an algorithm that can provide great improvements in error prevention. At a user interface (UI) level, this module is highly transparent to the user, and therefore no user intervention is necessarily required.

Figure 7:
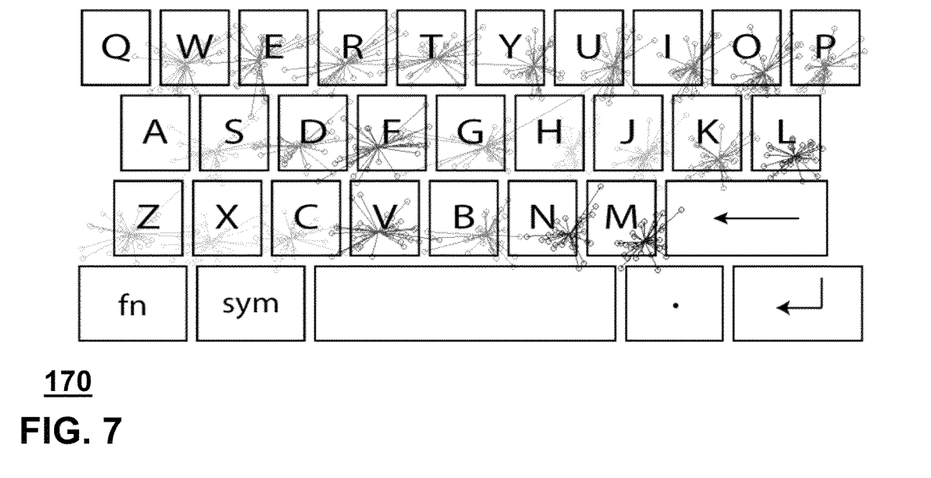
FIG. 7 illustrates the variation in touch points in a QWERTY keyboard in accordance with an embodiment herein.

The techniques for psychomotor prediction can eliminate the use of discrete target sizes and instead can use a center (X,Y) for each target, or a centroid (X,Y) for actual hits of each target. The psychomotor can also use mean touch distances from a center (or centroid) of each available target and/or standard deviation of touch distances from the center (or the centroid) of each available target as illustrated in diagram 170 of FIG. 7. This technique can be applied to any pattern of keys and is not necessarily limited to QWERTY keypads.

Psychomotor prediction as applied to QWERTY keypads (or any buttons or keys on a touchscreen) has a variability for finger presses that can be determined a priori. End points of a pointing task can have a normalized distribution. Because finger presses on a target can be considered as an end point of a pointing action, distribution of finger presses can be captured a priori. On a per key basis, distribution of finger presses can be defined in two ways: (i) distance of an xy position from center of the key (ie., target), and (ii) distance of an xy position from the centroid of pertinent finger presses related to that key. The distribution can be operationalized using mean and standard deviation of the distances. Due to noises natural to human psychomotor ability, these distribution parameters (ie., spread of hits and bias of hits) are different for each of the keys as illustrated on the QWERTY keypad 170 of FIG. 7. However statistically these parameters can be standardized using z-scores.

Based on the z-scores, the likelihood of a key press being intended for specific keys can be determined. Computationally, for each xy position (ie., finger press) registered, 26 probabilities (ie., one for each character on a QWERTY) can be computed. Of course, a different number of probabilities can be computed for other keypad arrangements other than QWERTY keys (such as transport keys in a multimedia application). To conserve computing power, only characters with probability value of more than 0.0001 (an adjustable variable) can be kept in the memory buffer.

In addition to the psychomotor prediction techniques used, the embodiments herein also use psycholinguistic prediction. For languages based on roman letters, letter frequency tables can be constructed to determine the likelihood of occurrence of a letter given what's in front of that letter. Two common letter frequency tables can be used for example. The frequency tables can be a diagraph frequency table or a triagraph frequency table (either one can be used, but only one can be used at a time). A diagraph table contains conditional probability for all 26 letters based on a letter immediate prior to the one in question. A triapgraph table contains conditional probability of all 26 letters based on two letters immediate prior to the one in question. All characters can be kept in a memory buffer. Note that embodiments herein are not necessarily limited to conventional languages based on roman letters, but it is contemplated to include within the scope of the claimed embodiments any language expressed using roman letters, including certain Asian languages that are romanizable (such as Chinese pinyin).

The calculation of a prevention predictive index can be determined using both the psychomotor and psycholinguistic predictions. For each xy position (ie., finger press), a predictive index is computed. The index is the result of a combination (such as by multiplication) of probabilities for all possible combinations, ie., psychomotor probabilities and psycholinguistic probabilities. For instance, if 5 characters are returned from psychomotor prediction, 130 (5 times 26)

indices are returned for each key press. The character with highest predictive index is returned in the text buffer (editor).

In addition to the error prevention techniques noted above, the embodiments can also use error correction techniques as a fall-back measure to error prevention. Error correction can be used and be set up to where it only kicks in when an end of string is detected (ie., detection of a spacebar, comma, question mark, period, return, etc.) with the hope to fix errors not captured by the "safety net", by means of (i) detecting ambiguous key presses, (ii) determining candidate letters for a particular ambiguous key press, and (iii) subsequent auto-correction of the character in question.

Figure 8:
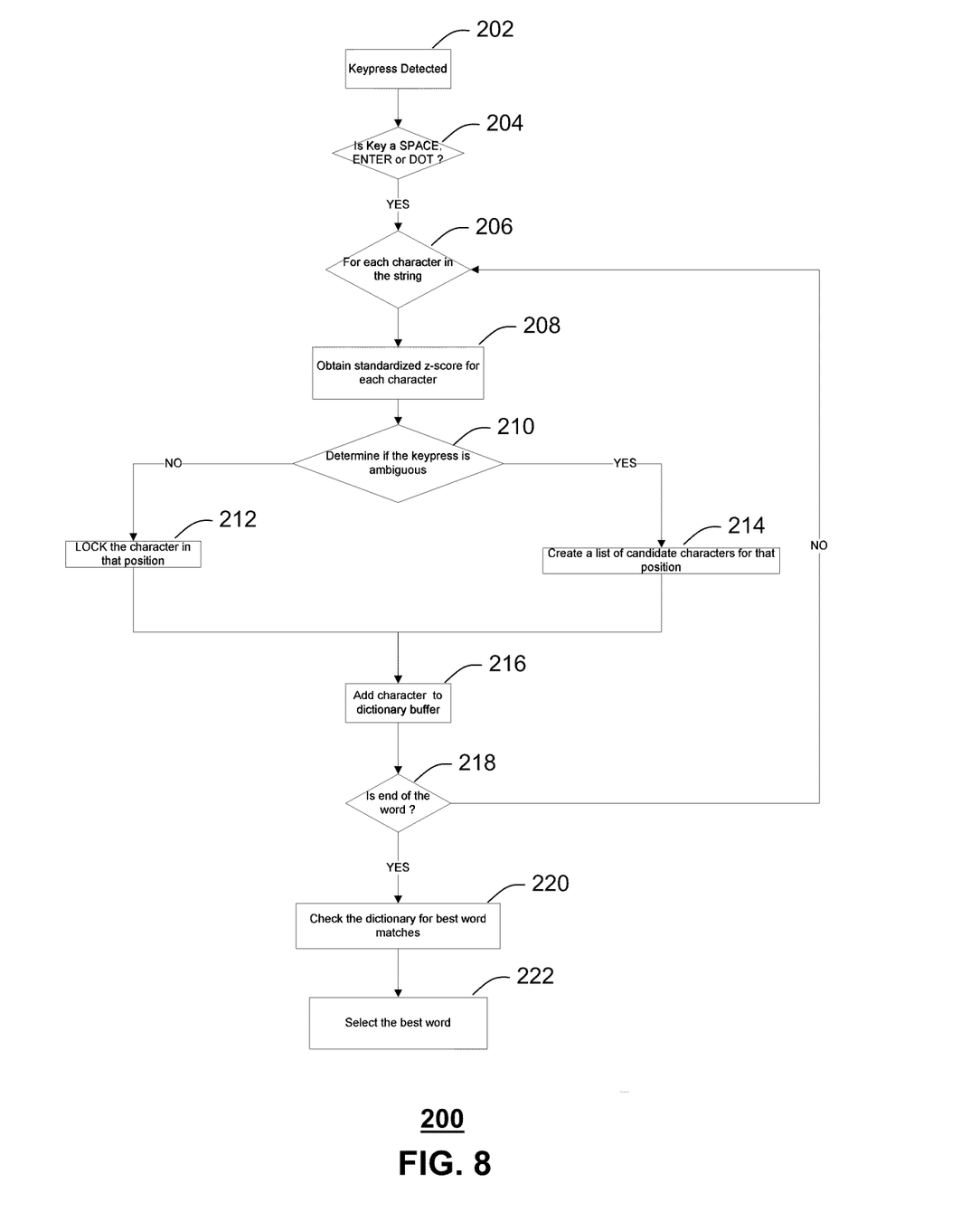
FIG. 8 is a flow chart illustrating a method of detecting ambiguous keypresses on a touchscreen and subsequent auto-corrections in accordance with an embodiment herein.

Referring to FIG. 8, a flow chart illustrating a method 200 of detecting ambiguous key presses is shown. The algorithm for the detection of ambiguous key presses can detect an ambiguous key press by determining whether or not the xy position falls within a common region of adjacent keys. The common region (ie., trigger value) can be pre-determined a priori, and is adjustable for desired sensitivity. Because the region is tied to distribution of finger presses, inherently it takes into consideration of psychomotor behavior of the finger.

Operationally, the computational steps for the ambiguous key press detection is as follows:

Detect a keypress at 202

Determine if a entry (such as a space, enter, return, dot) indicative of an end of a word has been entered at 204. This is used to trigger the Auto-correction feature:

For each xy position (ie., finger press), associated psychomotor probabilities are determined for each character (note it does not have to be all 26 characters depending on a cut-off value) in a string at 206. The probability list will be ordered from high to low and will be used later on to populate the candidate key for that particular position.

A z-score is obtained for these characters at 208.

Pairwise differences between the character with a highest z-score and the remaining characters are computed at decision step 210.

If the largest difference fails to exceed a trigger value, then the key press is assigned and locked to a character in a position of the string at 212.

If the largest difference exceeds the trigger value, then the key press is flagged as an ambiguous key press. A wildcard is assigned to the position and a list of candidate characters for that position in the string is created at 214. There can be multiple wildcards in a string.

The determination of candidate letters can produce a list of candidate letters to be inserted in place of the wildcards for submission of the word to dictionary engines such as Motorola's iTap. For instance, if there are 5 candidate characters identified for a wildcat, then those 5 candidates will be mapped for the particular wildcard position In the string. However, if the original string is already in the dictionary, no further steps are taken. In any event, whether the character is locked at 212 or a list of candidate letters are created at 214, the characters can be added to a dictionary buffer at 216. At 218, it is determined if all characters in a word string have be processed for ambiguity. If not, the character in the string is assessed. If all characters in a word string have been processed, then the dictionary can be checked for the best word matches at 220 and the best word is selected at 222. In one embodiment, the steps 220 and 222 can involve auto-correction where the string that returns the highest probability from the dictionary engines is determined and the word with highest probability "replaces" the original string. To avoid the scenario for which the machine is trying to be too "smart", auto-correction is disabled should backspaces be detected. This follows the logic that, if the algorithm auto-corrects an "error" but the user insists on keeping the "error", he or she would backspace to undo the correction. At this point the auto-correction is disabled for that word only.

In summary, the major components in one embodiment can include a trigger engine for redflagging an ambiguous keypress, a character candidates table that can be populated by candidate characters and their predicted psychomotor relationship to that keypress, and a text prediction engine such as Motorola's iTap engine. The trigger engine includes a distribution of keypresses for characters that are determined a priori. Using psychomotor modeling, distributions can be characterized using boundaries surrounding a reference point, ie., center of the target (character) or centroid of keypresses. Due to inherent noise in finger-oriented pointing tasks, distribution of keypresses not centered around the target symmetrically, ie., it may skew towards a certain direction along the xy-plane. Using the a priori information, the trigger engine determines whether a keypress falls within a boundary commonly shared by adjacent characters. The trigger engine can also determine a sensitivity of ambiguity detection by means of adjusting the trigger value. The trigger value (values that determines whether or not a touch press is ambiguous is adjustable along a spectrum of sensitivity levels. The sensitivity has to do with how "smart" the auto-correction can operate which may lead to false-corrections if it is set too high.

The trigger engine can also determine a list of candidate characters to be inserted in the position where ambiguity is detected. The candidate table can contain an array of characters and their spatial relationship (using standardized z-scores) with the keypress. Computation of standardized z-scores can be based on a priori information (ie., scatter data of keypresses for each character). In the table, the characters can be ordered in terms of its z-score in ascending order. The candidate tablee also provides candidate characters to the trigger engine for insertion in a position for which ambiguity is detected for that keypress. The dictionary used in one embodiment is iTap, but embodiments herein are not necessarily limited to such dictionary.

Referring once again to FIG. 8, for every keypress in a string, the engine determines if it is ambiguous and if ambiguity is detected, candidate characters (determined using standardized z-scores are stored in a buffer. Candidate characters are inserted in the position, and the entire string is submitted to a dictionary such as the iTap combination API. A candidate string with a highest probability (returned from iTap or other dictionary engine) replaces the original string. In one particular embodiment, when an end of word is detected, the engine determines the ambiguity of each keypress in the string and the determination of ambiguity is based on a trigger value (x).

For example, here is an instance where a user presses an area somewhere between the icons O, P, and L on a (virtual) QWERTY keypad

| Character | z-score |
|---|---|
| O | 1.50 |
| P | 1.55 |
| L | 2.00 |
| K | 2.55 |
| I | 3.00 |

Trigger value (x)=pairwise difference of z-score, between character with lowest z-score and other characters For instance,
    xO-p=0.05
    xO-L=0.50
    xO-K=1.05
    xO-I=1.5
If x=1.25, the keypress is flagged as ambiguous. Subsequently, the engine grabs O, P, and L for insertion in the ambiguous position

| Characters Entered | Value from iTap Dictionary |
|---|---|
| O * I N I O N | |
| O O I N I O N | .00 |
| O P I N I O N | .77 |
| O L I N I O N | .00 |

Candidate characters are inserted in the position where ambiguity is detected. The engine submitted the strings to iTap or other dictionary engine, in which a probability value is returned. The algorithm would then accept the string with highest value.

Figure 9:
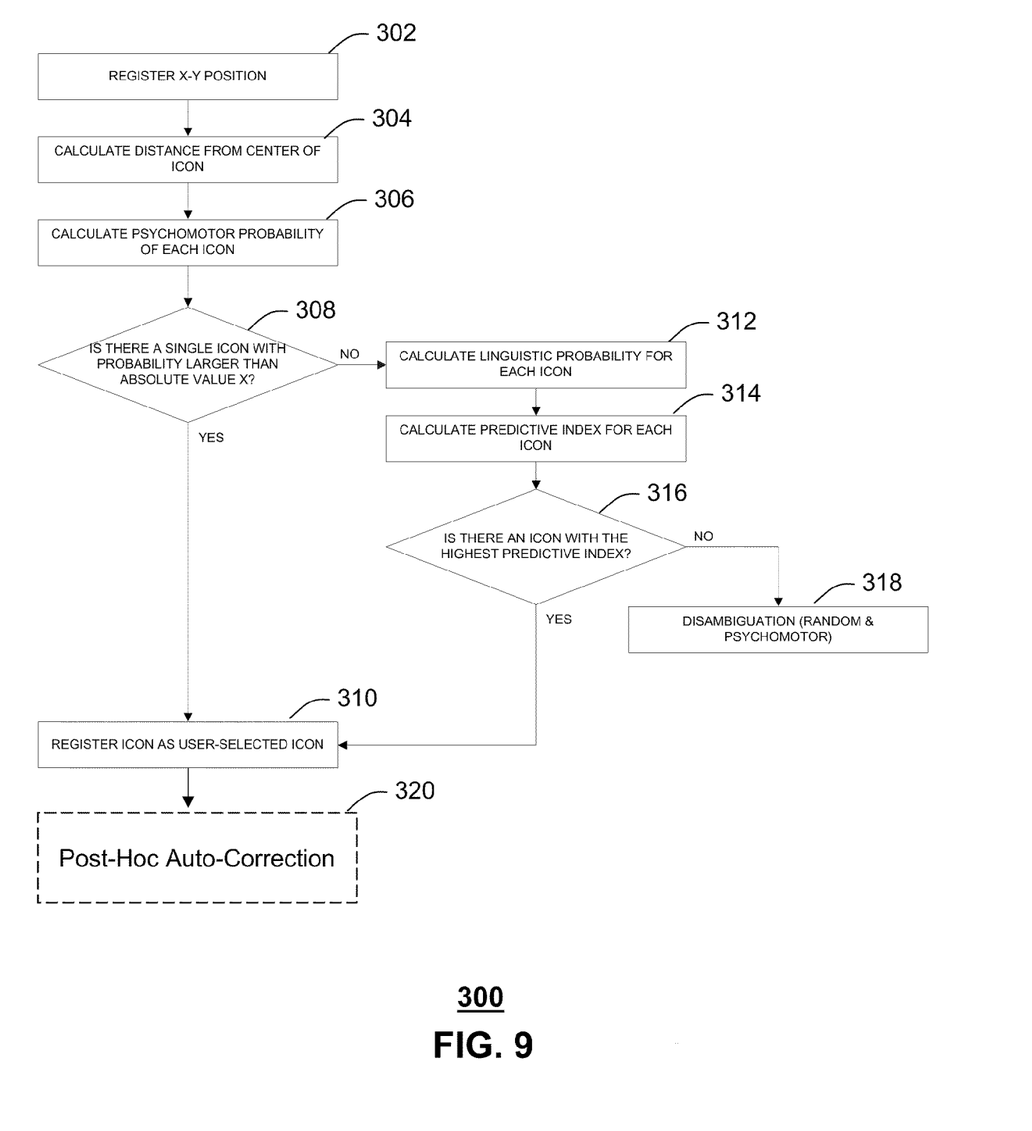
FIG. 9 is a flow chart illustrating a method of psychomotor and psycholinguistic prediction in accordance with an embodiment herein.

Referring to FIG. 9, a flow chart illustrating a method 300 of key press prediction on a touch-based device can entail registering a position of a touch press attempt on an icon among a plurality of icons presented on the touch-base device at 302, calculating at 304 a distance from a center (or a centroid as discussed above) of the icon, and calculating at 306 a psychomotor probability for each icon in the plurality of icons. At decision step 308, a determination is made whether there is a single icon with a probability larger than an absolute value of X. If there is an icon with a larger probability at step 308, then the icon is registered as the user selected icon at step 310 and post-hoc auto-correction can follow at 320. If not, then the method moves on to calculate at 312 a linguistic probability for each icon in the plurality of icons and then calculate a predictive index for each icon in the plurality of icons based on the psychomotor probability and the linguistic probability at 314. At decision step 316, if there is an icon with a highest predictive index, then the icon is registered as the user selected icon at 310 and post-hoc auto-correction can follow at 320. If there is no icon with a highest predictive index at 316, then a disambiguation process (see FIG. 8) can occur at 318.

Figure 10:
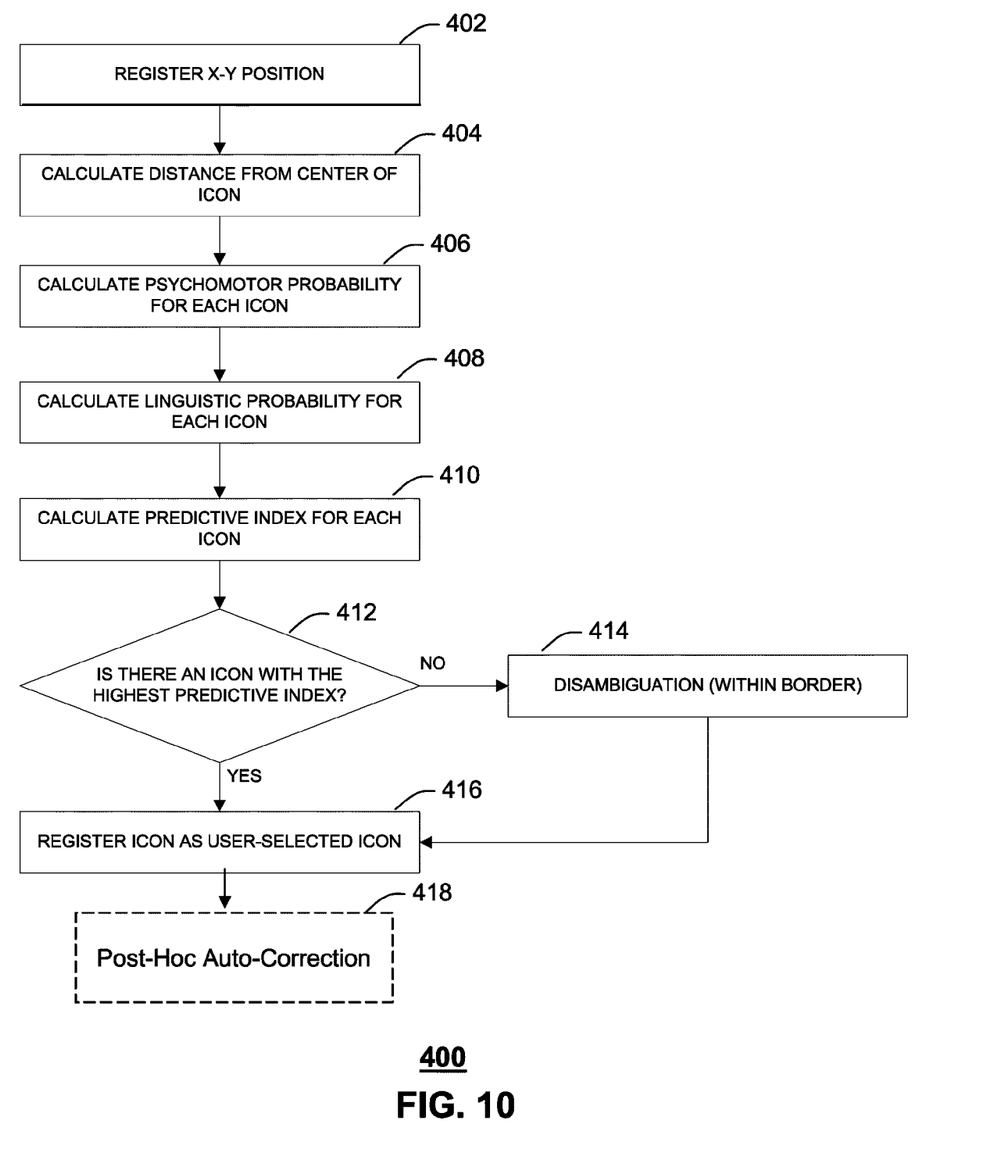
FIG. 10 is a flow chart illustrating another method of psychomotor and psycholinguistic prediction in accordance with an embodiment herein.

Referring to FIG. 10, a flow chart illustrating an alternative method 400 of key press prediction on a touch-based device can entail registering a position of a touch press attempt on an icon among a plurality of icons presented on the touch-base device at 402, calculating at 404 a distance from a center (or a centroid as discussed above) of the icon, calculating at 406 a psychomotor probability for each icon in the plurality of icons, calculating at 408 a linguistic probability for each icon in the plurality of icons and then calculating a predictive index at for each icon in the plurality of icons based on the psychomotor probability and the linguistic probability at 410. At decision step 412, if there is an icon with a highest predictive index, then the icon is registered as the user selected icon at 416 and post-hoc auto-correction can follow at 418. If there is no icon with a highest predictive index at 412, then a disambiguation process (see FIG. 8) can occur at 414.

Figure 11:
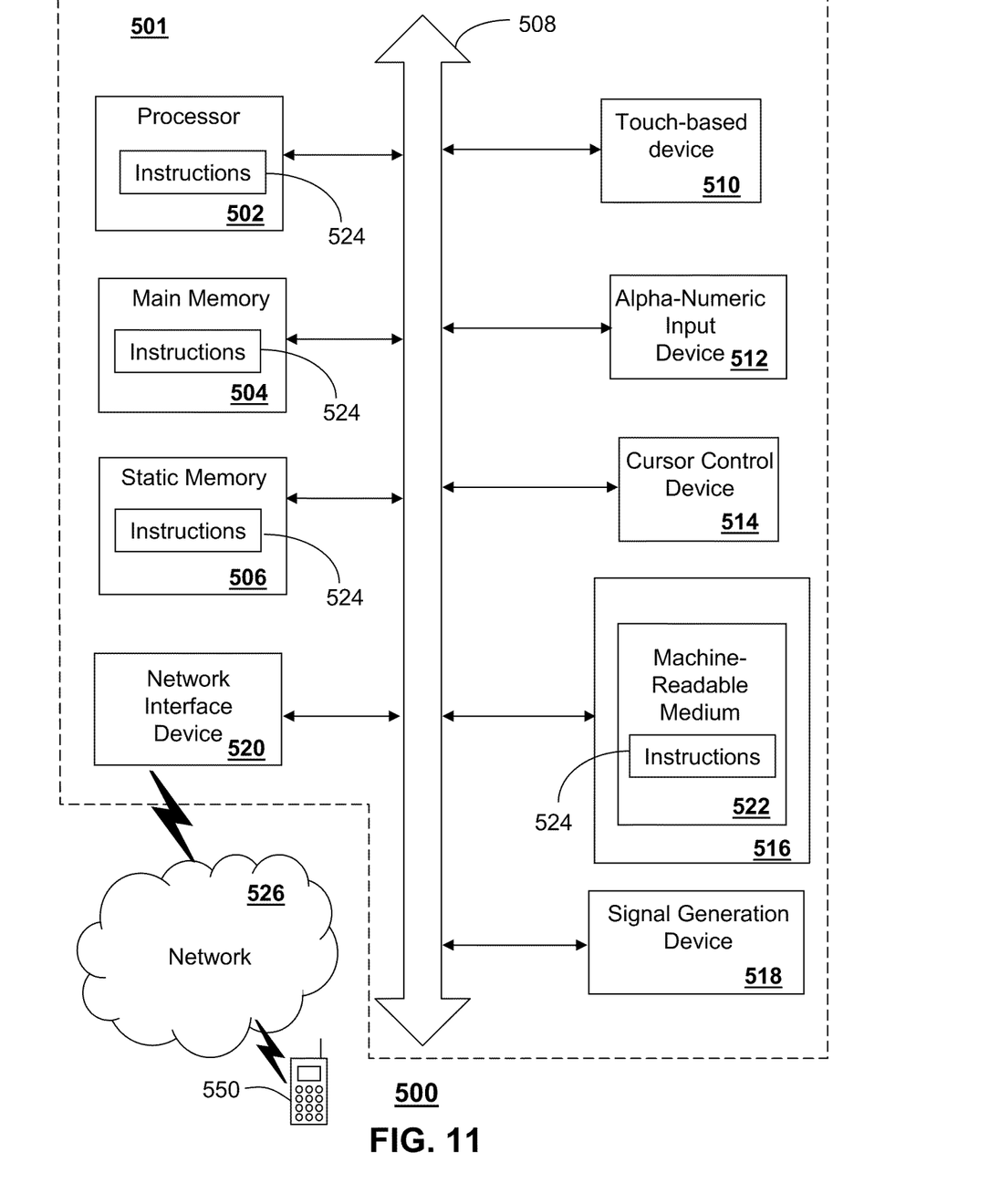
FIG. 11 is an electronic device having a controller using psychomotor and psycholinguistic prediction in accordance with an embodiment herein.

In another embodiment of the present invention as illustrated in the diagrammatic representation of FIG. 11, an electronic device 501 such as a machine having a touch based device or display or screen 510 can include a processor or controller 502 coupled to the display. The device 501 can be a hand-held device selected among a cellular phone, a personal digital assistant, a smart phone, an MP3 Player, a music player, a remote controller, a wrist-worn computer, and a watch for example. Generally, in various embodiments it can be thought of as a machine in the form of a computer system 500 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. For example, the computer system can include a recipient device 501 and a sending device 550 or vice-versa which may communicate with each other via a network 526.

The machine may comprise a server computer, a client user computer, a personal computer (PC), a tablet PC, personal digital assistant, a cellular phone, a laptop computer, a desktop computer, a control system, a network router, switch or bridge, or any machine capable of executing a set of instructions (sequential or otherwise) that specify actions to be taken by that machine, not to mention a mobile server. It will be understood that a device of the present disclosure includes broadly any electronic device that provides voice, video or data communication or presentations. Further, while a single machine is illustrated, the term "machine" shall also be taken to include any collection of machines that individually or jointly execute a set (or multiple sets) of instructions to perform any one or more of the methodologies discussed herein.

The computer system 500 can include a controller or processor 502 (e.g., a central processing unit (CPU), a graphics processing unit (GPU, or both), a main memory 504 and a static memory 506, which communicate with each other via a bus 508. The computer system 500 may further include a presentation device such the touch-based device 510. The computer system 500 may include an input device 512 (e.g., a keyboard, microphone, etc.), a cursor control device 514 (e.g., a mouse), a memory unit 516, and a signal generation device 518 (e.g., a speaker or remote control that can also serve as a presentation device) and a network interface device 520 which may include a transmitter or a receiver or a transceiver. Of course, in the embodiments disclosed, many of these items are optional.

The memory unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor or controller 502 during execution thereof by the computer system 500. The main memory 504 and the processor or controller 502 also may constitute machine-readable media.

Dedicated hardware implementations including, but not limited to, application specific integrated circuits, programmable logic arrays, FPGAs and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but are not limited to, distributed processing or component/object distributed processing, parallel processing, or virtual machine processing can also be constructed to implement the methods described herein. Further note, implementations can also include neural network implementations, and ad hoc or mesh network implementations between communication devices.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

REFERENCES

1. Parhi, P., Karlson, A. K., & Bederson, B. B. (2006). Target size study for one-handed thumb use on small touchscreen devices. *Proceedings of Mobile HCI* 2006, 203-210.
2. U.S. Pat. No. 7,312,410 B2.
3. US Application No. US2007/0152980 A1.
4. U.S. Pat. No. 6,271,835 B1.
5. US Application No. US2003/0193478 A1.
6. U.S. Pat. No. 7,218,249 B2.
7. US Application No. US2007/0229476 A1.
8. US Application No. US2006/0085757 A1.
9. International Publication No. WO/2000/39041.
10. International Publication No. WO/2008/095153.
11. Crossman, E. R. F. W., & Goodeve, P. J. (1983). Feedback control of hand-movement and Fitts' Law. Reprinted in *Quarterly Journal of Experimental Psychology*, 35A, 251-278. (Originally presented as a paper at the meeting of the Experimental Psychology Society, Oxford, England, July 1963).
12. Fitts, P. M. (1954). The information capacity of the human motor system in controlling the amplitude of movement. *Journal of Experimental Psychology*, 47, 381-391.
13. Fitts, P. M., & Radford, B. K. (1966). Information capacity of discrete motor responses under different cognitive sets. *Journal of Experimental Psychology*, 71, 475-482.
14. U.S. Pat. No. 7,380,724
15. Meyer, D. E., Abrams, R. A., Kornblum, S., Wright, C. E., & Smith, J. E. K. (1988). Optimality in human motor performance: Ideal control of rapid aimed movements. Psychological Review, 95(3), 340-370.
16. Balakrishnan, R. (2004) Beating Fitts law: virtual enhancements of pointing facilitations

What is claimed is:

1. A method of key press prediction on a touch-based device, comprising:
   registering a position of a touch press attempt on an icon among a plurality of icons presented on the touch-base device;
   calculating a distance from a reference point of the icon to the position;
   calculating a psychomotor probability for each icon in the plurality of icons;
   calculating a linguistic probability for each icon in the plurality of icons;
   calculating a predictive index for each icon in the plurality of icons based on the psychomotor probability and the linguistic probability; and
   registering as a user selected icon, an icon with one among a highest predictive index and a probability higher than a predetermined absolute value,
   wherein for the psychomotor probability calculation, a distribution of finger presses is defined by one among a distance of an x-y position from a center of an icon or key or by a distance of an x-y position from a centroid of pertinent finger presses related to the icon or key, and
   wherein the distribution of finger presses is a parameter that is standardized using z-scores which allow the determination of a likelihood of an intended key press for specific keys.

2. The method of claim 1, wherein the method calculates the psychomotor probability and the linguistic probability if there is no single icon with a larger probability than the predetermined absolute value.

3. The method of claim 1, wherein the method performs a disambiguation function if there is no icon with a highest predictive index before registering the user selected icon.

4. The method of claim 1, wherein the method performs a disambiguation function if there is no icon with a highest predictive index and no single icon with the larger probability than the predetermined absolute value before registering the user selected icon.

5. The method of claim 1, wherein the method performs post-hoc auto-correction after detection of completion of a word.

6. The method of claim 1, wherein the method determines for each touch press attempt on an icon if the touch press attempt is ambiguous and creates a list of candidate characters for a given position of the character in the word.

7. The method of claim 6, wherein the method determines if a word is completed and then checks a dictionary for best word matches.

8. The method of claim 1, wherein the variability of finger presses on a QWERTY key arrangement is determined a priori and used for the psychomotor probability calculation.

9. The method of claim 1, wherein the distribution of finger key presses is captured a priori and used for the psychomotor probability calculation.

10. The method of claim 1, wherein for the psychomotor probability calculation, a distribution of finger presses is defined by a distance of an x-y position from a reference point of an icon or a key or from a center of the icon or key, or from a centroid of touch presses.

11. The method of claim 1, wherein for the psychomotor probability calculation, a distribution of finger presses is defined by a distance of an x-y position from a centroid of pertinent finger presses related to the icon or key.

12. The method of claim 1, wherein the method constructs letter frequency tables to determine a likelihood of an occurrence of a letter based on the characters in front of a given letter.

13. The method of claim 1, wherein the predictive index is computed by combining the psychomotor probability with the linguistic probability.

14. The method of claim 1, wherein the method calculates the distance from the reference point of the icon by calculating from a center of the icon as the reference point.

15. The method of claim 1, wherein the method calculates the distance from the reference point of the icon by calculating from a centroid of touch points collected a priori.

16. An electronic device, comprising:
a touch-based presentation device; and
a controller coupled to the touch-based presentation device operable to:
register a position of a touch press attempt on an icon among a plurality of icons presented on the touch-base device;
calculate a distance from a reference point of the icon;
calculate a psychomotor probability for each icon in the plurality of icons;
calculate a linguistic probability for each icon in the plurality of icons;
calculate a predictive index for each icon in the plurality of icons based on the psychomotor probability and the linguistic probability; and
register as a user selected icon, an icon with one among a highest predictive index and a probability higher than a predetermined absolute value,
wherein for the psychomotor probability calculation, a distribution of finger presses is defined by one among a distance of an x-y position from a center of an icon or key or by a distance of an x-y position from a centroid of pertinent finger presses related to the icon or key, and
wherein the distribution of finger presses is a parameter that is standardized using z-scores which allow the determination of a likelihood of an intended key press for specific keys.

17. The electronic device of claim 16, wherein the electronic device is one among a cellular phone, a personal digital assistant, a laptop computer a smart phone, an MP3 player, and a remote controller.

18. A portable communication device, comprising:
a touch-based screen; and
a controller coupled to the touch-based screen operable to:
register a position of a touch press attempt on an icon among a plurality of icons presented on the touch-base device;
calculate a distance from a center of the icon;
calculate a psychomotor probability for each icon in the plurality of icons;
calculate a linguistic probability for each icon in the plurality of icons;
calculate a predictive index for each icon in the plurality of icons based on the psychomotor probability and the linguistic probability; and
register as a user selected icon, an icon with a highest predictive index,
wherein an icon comprises a key,
wherein for the psychomotor probability calculation, a distribution of finger presses is defined by a distance of an x-y position from a center of an key or by a distance of an x-y position from a centroid of pertinent finger presses related to the key, and
wherein the distribution of finger presses is a parameter that is standardized using z-scores which allow the determination of a likelihood of an intended key press for specific keys.

* * * * *